United States Patent
Amano et al.

(10) Patent No.: US 9,725,878 B2
(45) Date of Patent: Aug. 8, 2017

(54) HYBRID-TYPE CONSTRUCTION MACHINE

(71) Applicants: Hitachi Construction Machinery Co., Ltd., Tokyo (JP); Takako Satake, Ishioka-shi (JP)

(72) Inventors: Hiroaki Amano, Kasumigaura (JP); Kouji Ishikawa, Kasumigaura (JP); Hidetoshi Satake, Ishioka (JP); Shinya Imura, Toride (JP); Shinji Nishikawa, Kasumigaura (JP); Tomoaki Kaneta, Kasumigaura (JP); Shiho Izumi, Hitachinaka (JP)

(73) Assignee: Hitachi Construction Machinery Co., Ltd., Tokyo (JP)

(*) Notice: Subject to any disclaimer, the term of this patent is extended or adjusted under 35 U.S.C. 154(b) by 0 days.

(21) Appl. No.: 14/915,304

(22) PCT Filed: Sep. 18, 2014

(86) PCT No.: PCT/JP2014/074729
§ 371 (c)(1),
(2) Date: Feb. 29, 2016

(87) PCT Pub. No.: WO2015/056520
PCT Pub. Date: Apr. 23, 2015

(65) Prior Publication Data
US 2016/0298313 A1    Oct. 13, 2016

(30) Foreign Application Priority Data

Oct. 18, 2013    (JP) ................................. 2013-217847

(51) Int. Cl.
*E02F 9/12* (2006.01)
*E02F 9/20* (2006.01)
(Continued)

(52) U.S. Cl.
CPC ................ *E02F 9/123* (2013.01); *E02F 9/20* (2013.01); *E02F 9/2004* (2013.01);
(Continued)

(58) Field of Classification Search
CPC ... E02F 9/123; E02F 9/121; E02F 9/20; E02F 9/22; E02F 9/12; E02F 9/2004;
(Continued)

(56) References Cited

U.S. PATENT DOCUMENTS

2010/0162706 A1*  7/2010  Sakai ..................... E02F 3/325
                                                          60/706
2012/0130576 A1   5/2012  Sugiyama et al.

FOREIGN PATENT DOCUMENTS

EP     2711470 A1      3/2014
JP     55-136786 U     3/1954
(Continued)

OTHER PUBLICATIONS

International Search Report (PCT/ISA/210) issued in PCT Application No. PCT/JP2014/074729 dated Nov. 11, 2014 with English translation (5 pages).
(Continued)

*Primary Examiner* — Keith J Frisby
(74) *Attorney, Agent, or Firm* — Crowell & Moring LLP (57) ABSTRACT

Provided is a hybrid-type construction machine including a swing device of the hydraulic-electric combined swing type and by which, in a work for which accurate swing operability is demanded like, for example, a crane work, a swing body is driven alone by the electric motor.
The hybrid-type construction machine includes an engine, a hydraulic pump driven by the engine, a swing body, an electric motor for driving the swing body, and a hydraulic motor driven by the hydraulic pump for driving the swing body. The swing body is swung by simultaneous drive by the electric motor and the hydraulic motor. The hybrid-type construction machine includes a control apparatus having a (Continued)

work mode changeover unit by which an operator changes over a mode in response to an aspect of a work and an electric alone swing controlling unit configured to control the swing body to be swung by the electric motor alone. When a work in which position accuracy is demanded is selected by the work mode changeover unit, the swing body is swung by the electric alone swing controlling unit.

5 Claims, 9 Drawing Sheets

(51) Int. Cl.
    *E02F 9/22*     (2006.01)
    *E02F 3/32*     (2006.01)

(52) U.S. Cl.
    CPC .......... *E02F 9/2095* (2013.01); *E02F 9/2246* (2013.01); *B60Y 2200/416* (2013.01); *E02F 3/32* (2013.01)

(58) Field of Classification Search
    CPC ..... E02F 9/2095; E02F 9/2296; E02F 9/2075; B60L 2200/40; F15B 15/088; B60Y 2200/412; B60Y 2200/416; B60Y 2200/41
    USPC ................ 180/53.4; 701/50; 414/687, 744.2
See application file for complete search history.

(56) References Cited

FOREIGN PATENT DOCUMENTS

| | | |
|---|---|---|
| JP | 2001-226077 A | 8/2001 |
| JP | 2011-241653 A | 12/2011 |
| KR | 10 2011 0084960 A | 7/2011 |
| WO | 2012/157510 A1 | 11/2012 |

OTHER PUBLICATIONS

International Preliminary Report on Patentability (PCT/IB/338 & PCT/IB/373) issued in PCT Application No. PCT/JP2014/074729 dated Apr. 28, 2016, including English translation of Japanese-language Written Opinion (PCT/ISA/237), (6 pages).

Korean-language Office Action issued in counterpart Korean Application No. 10-2016-7004084 dated Feb. 13, 2017 (five (5) pages).

* cited by examiner

HYBRID-TYPE CONSTRUCTION MACHINE

TECHNICAL FIELD

The present invention relates to a hybrid-type construction machine, and more particularly to a hybrid-type construction machine that includes a swing hydraulic motor and a swing electric motor as means for driving a swing body.

BACKGROUND ART

In hybrid-type construction machines that include both of a hydraulic motor and an electric motor for driving a swing body, some hybrid-type construction machine includes such a configuration that, in order to execute a satisfactory work even in the case where such a situation that torque of the electric motor cannot be generated occurs from some reason, it is possible to perform changeover between a mode (hydraulic-electric combined swing mode) in which torque of both of the hydraulic motor and the electric motor is used for swing driving and another mode (hydraulic alone swing mode) in which the hydraulic motor is used alone for swing driving (for example, refer to Patent Document 1).

PRIOR ART DOCUMENT

Patent Document

Patent Document 1: JP-2011-241653-A

SUMMARY OF THE INVENTION

Problem to be Solved by the Invention

Incidentally, in general works of a construction machine, for example, excavation, swing loading and so forth, implementation of a large work amount by high swing force is sometimes demanded for driving control of a swing body. However, for control of the swing speed or control of a swing stopping position of a swing body, high accuracy is rarely required.

Meanwhile, in a special work of a construction machine, for example, in a crane work, highly accurate control of the swing speed is required because a variation of the swing speed not intended by an operator gives rise to shaking of the suspended load and this leads to a serious disaster such as dropping of the load. Further, when the load is hung or is taken down, highly accurate control of the stopping position is required in order to stop the hook of the crane at an accurate position.

In another work, for example, in a work such as automobile dismantling in which a fine target is handled using an attachment, accurate positional controllability is demanded. When such a work as just described is performed, the hydraulic-electric combined swing method in which both of an electric motor and a hydraulic motor are driven and the hydraulic along swing method in which the hydraulic motor is driven alone are unsatisfactory because accurate swing acceleration cannot be performed by the hydraulic motor.

This is because, while the swing torque of the hydraulic motor that determines the swing acceleration depends upon the differential pressure between the inflow/outflow ports of the hydraulic motor, the control for keeping the pressure to be applied to the swing port fixed is difficult. The pressure applied to the swing port is influenced complicatedly by various factors such as the opening of a directional control valve, the characteristic of a relief valve, an unintended pressure effect such as pressure pipe loss and so forth.

On the other hand, control of the torque/speed of the electric motor can be implemented comparatively easily by controlling the electric current value or the frequency of the applied voltage. However, in the hydraulic-electric combined swing method, since part of the swing torque is borne by the hydraulic motor, difficulty in control similar to that confronted by the hydraulic alone swing method arises.

The present invention has been made in view of such matters as described above, and the object of the present invention resides in provision of a hybrid-type construction machine that includes a swing device of the hydraulic-electric combined swing type and by which, in a work for which accurate swing operability is demanded like, for example, a crane work, the swing body is driven alone by the electric motor.

Means for Solving the Problem

To achieve the object described above, a first aspect of the present invention provides a hybrid-type construction machine that includes an engine, a hydraulic pump driven by the engine, a swing body, an electric motor for driving the swing body, and a hydraulic motor driven by the hydraulic pump for driving the swing body. The swing body is swung by simultaneous drive by the electric motor and the hydraulic motor. The hybrid-type construction machine includes a control apparatus including a work mode changeover unit by which an operator changes over a mode in response to an aspect of a work and an electric alone swing controlling unit configured to control the swing body to be swung by the electric motor alone. The electric alone swing controlling unit is configured to swing the swing body when a work in which position accuracy is demanded is selected by the work mode changeover unit.

Further, a second aspect of the present invention provides the hybrid-type construction machine according to the first aspect, wherein, when a crane mode is selected by the work mode changeover unit, the control apparatus controls the electric alone swing controlling unit to swing the swing body.

Furthermore, a third aspect of the present invention provides the hybrid-type construction machine according to the first aspect, wherein the control apparatus can set for each work mode whether or not the electric alone swing controlling unit is to be used.

Further, a fourth aspect of the present invention provides the hybrid-type construction machine according to the first aspect, wherein maximum output power of the electric motor is lower than maximum output power of the hydraulic motor. When a work for which a high swing speed is not demanded but positioning accuracy is demanded is selected by the work mode changeover unit, the control apparatus controls the electric alone swing controlling unit to swing the swing body.

Furthermore, a fifth aspect of the present invention provides the hybrid-type construction machine according to any one of the first to fourth aspects, further including a swing operation lever apparatus that issues an instruction for driving the swing body, and an operation amount detection unit that detects an operation amount of the swing operation lever apparatus. The electric alone swing controlling unit of the control apparatus fetches an operation amount of the swing operation lever apparatus detected by the operation amount detection unit and controls output power of the electric motor by setting, in a region in which the swing operation amount is small, output power equal to that in combined driving of the electric motor and the hydraulic motor as a target value but setting, when the operation amount is a maximum value, output power that does not exceed a limit output power of the electric motor as a target value.

Effect of the Invention

With the present invention, when a work mode in which accurate swing operability is demanded is selected, the electric alone swing by which the swing body is driven by the electric motor alone. As a result, high swing workability can be implemented and the general versatility of the hybrid-type construction machine is improved.

MODES FOR CARRYING OUT THE INVENTION

In the following, an embodiment of the present invention is described with reference to the drawings taking a hydraulic excavator as an example. It is to be noted that the present invention can be applied to general working and construction machines that include a swing body.

First Embodiment

Figure 1:
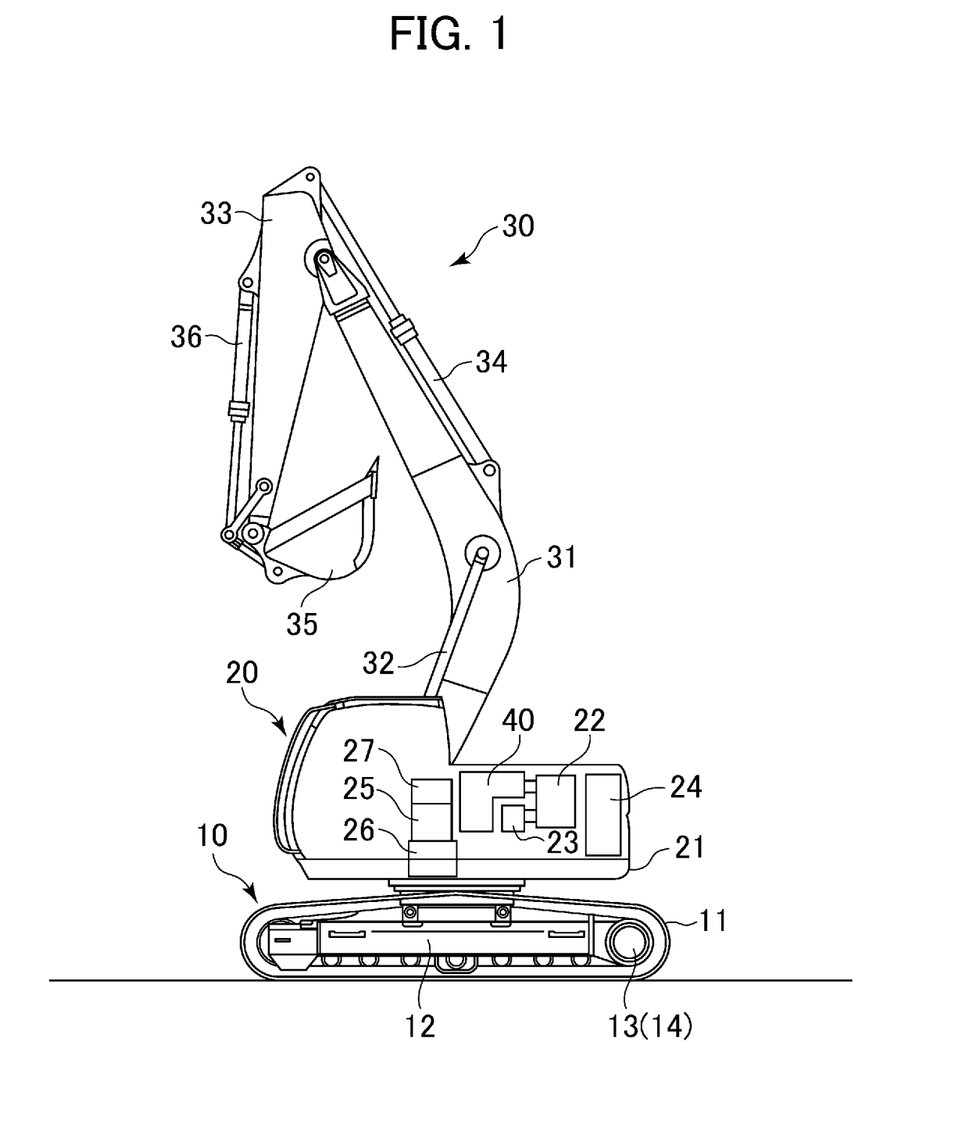
FIG. 1 is a side elevational view depicting a first embodiment of a hybrid-type construction machine of the present invention.
Figure 2:
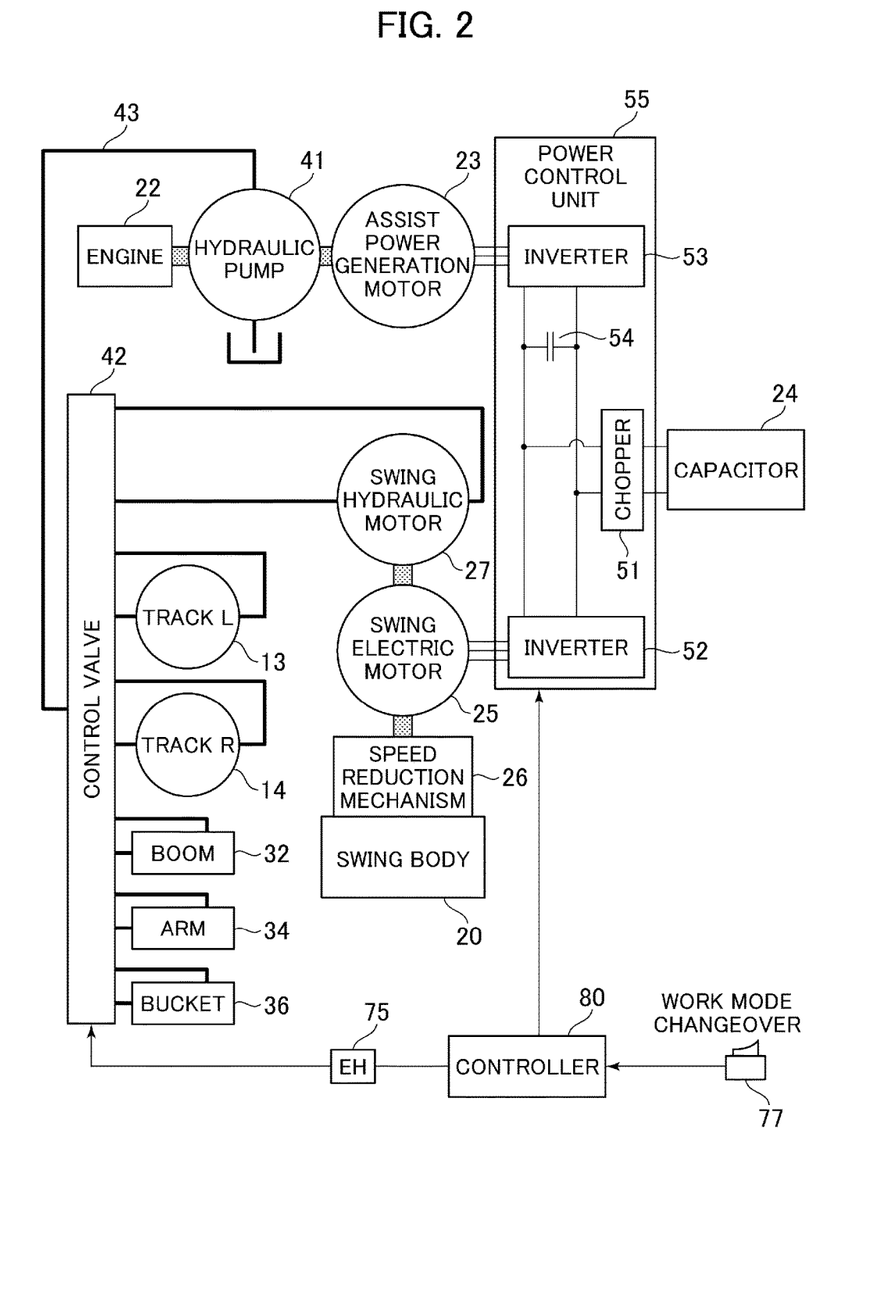
FIG. 2 is a system configuration diagram of an electric-hydraulic apparatus that configures the first embodiment of the hybrid-type construction machine of the present invention.
Figure 3:
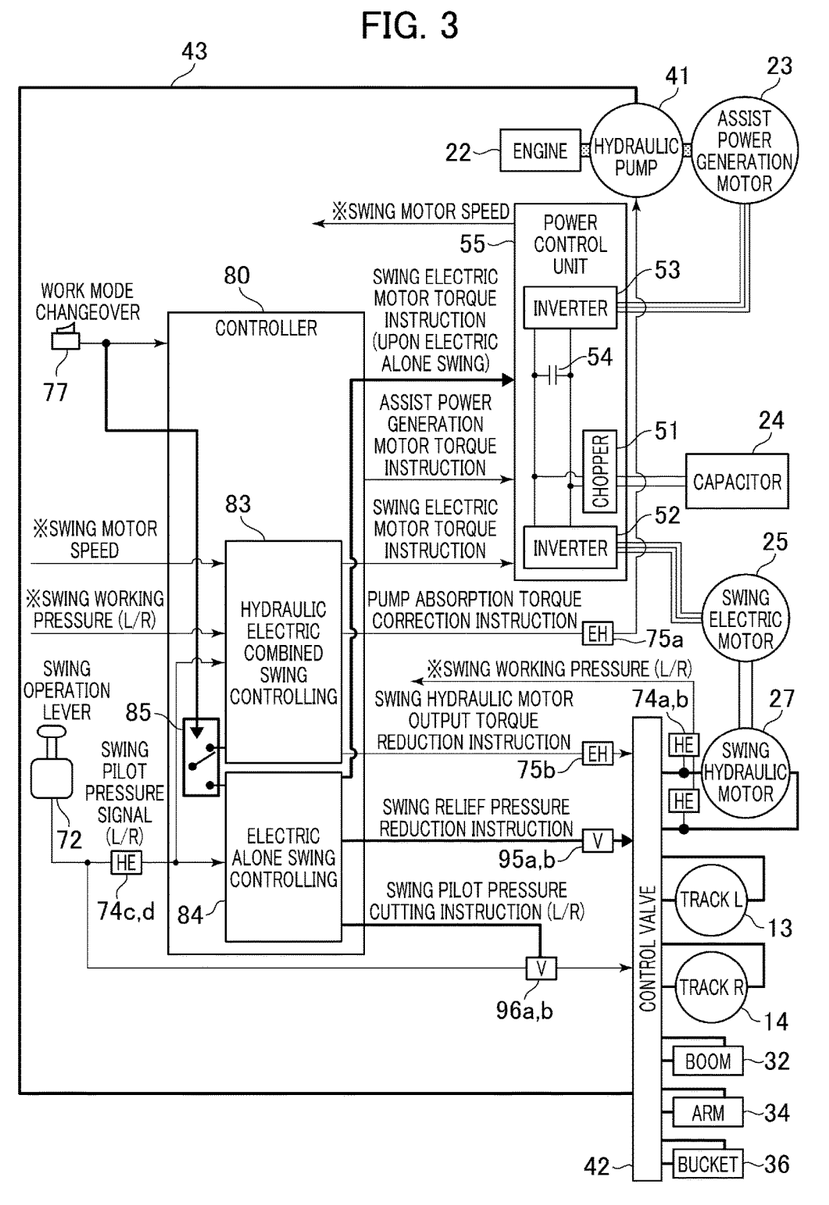
FIG. 3 is a system configuration and control block diagram of the first embodiment of the hybrid-type construction machine of the present invention.

FIG. 1 is a side elevational view depicting a first embodiment of a hybrid-type construction machine of the present invention; FIG. 2 is a system configuration diagram of an electric-hydraulic apparatus that configures the first embodiment of the hybrid-type construction machine of the present invention; and FIG. 3 is a system configuration and control block diagram of the first embodiment of the hybrid-type construction machine of the present invention.

Referring to FIG. 1, the hydraulic excavator includes a track structure 10, a swing body 20 provided to be swingable on the track structure 10 and a front work apparatus 30 mounted on the swing body 20.

The track structure 10 is configured from a pair of crawlers 11 and a pair of crawler frames 12 (in FIG. 1, only those on one side are depicted), a pair of track hydraulic motors 13 and 14 for driving and controlling the crawlers 11 independently of each other, speed reduction mechanisms for the track hydraulic motors 13 and 14 and so forth.

The swing body 20 is configured from a swing frame 21, an engine 22 as a prime mover provided on the swing frame 21, an assist power generation motor 23 driven by the engine, a swing electric motor 25 and a swing hydraulic motor 27, an electric double-layer capacitor 24 connected to the assist power generation motor 23 and the swing electric motor 25, a speed reduction mechanism 26 for reducing the speed of rotation of the swing electric motor 25 and the swing hydraulic motor 27, and so forth. Driving force of the swing electric motor 25 and the swing hydraulic motor 27 is transmitted through the speed reduction mechanism 26. The swing body 20 (swing frame 21) is thereby driven and swung against the track structure 10 by the driving force.

Further, the front work apparatus 30 is mounted on the swing body 20. The front work apparatus 30 is configured from a boom 31, a boom cylinder 32 for driving the boom 31, an arm 33 supported for pivotal motion at a portion of the boom 31 in the proximity of an end portion, an arm cylinder 34 for driving the arm 33, a bucket 35 supported for pivotal motion at the distal end of the arm 33, a bucket cylinder 36 for driving the bucket 35 and so forth.

On the swing frame 21 of the swing body 20, a hydraulic system 40 for driving hydraulic actuators such as the track hydraulic motors 13 and 14, swing hydraulic motor 27, boom cylinder 32, arm cylinder 34 and bucket cylinder 36 described hereinabove is mounted. The hydraulic system 40 serves as a hydraulic fluid source and includes a hydraulic pump 41 (refer to FIG. 2) that is driven to rotate by the engine 22 and a control valve 42 (refer to FIG. 2) for controlling and driving the actuators.

Now, a system configuration of the electric and hydraulic apparatus of the hydraulic excavator is described generally. As depicted in FIG. 2, driving force of the engine 22 is transmitted to the hydraulic pump 41. The control valve 42 controls the delivery rate and the delivery direction of hydraulic fluid to the boom cylinder 32, arm cylinder 34, bucket cylinder 36 and track hydraulic motors 13 and 14 in response to an operation instruction from a control lever not depicted. Further, the control valve 42 controls the delivery rate and the delivery direction of hydraulic fluid for the swing hydraulic motor 27 in response to a swing operation instruction from an operation lever 72 (refer to FIG. 3) for swing.

The electric system is configured from the assist power generation motor 23, capacitor 24 and swing electric motor 25 described hereinabove, and a power control unit 55 and so forth. The power control unit 55 has a chopper 51, inverters 52 and 53, a smoothing capacitor 54 and so forth.

DC power from the capacitor 24 is boosted to a predetermined bus voltage by the chopper 51 and is inputted to the inverter 52 for driving the swing electric motor 25 and the inverter 53 for driving the assist power generation motor 23. The smoothing capacitor 54 is provided in order to stabilize the bus voltage. Rotary shafts of the swing electric motor 25 and the swing hydraulic motor 27 are coupled to each other and drive the swing body 20 through the speed reduction mechanism 26. The capacitor 24 is charged or discharged in response to a driving state of the assist power generation motor 23 and the swing electric motor 25 (whether they are powering or generating).

A controller 80 receives signals not depicted in FIG. 2 such as a control lever signal, a pressure signal and a rotational speed signal and a work mode signal from a work mode changeover switch 77 installed in the cab as inputs thereto and issues instructions to the control valve 42 and the power control unit 55 to perform swing control. Reference numeral 75 denotes a device for converting an electric signal from the controller 80 into a hydraulic pilot signal, and the device 75 corresponds, for example, to a solenoid proportional valve.

A system configuration and control block diagram of the hydraulic excavator is depicted in FIG. 3. Although the system configuration of the electric and hydraulic apparatus depicted in FIG. 3 is basically similar to that depicted in FIG. 2, devices, control units, control signals and so forth necessary to perform swing control according to the present invention are depicted in detail.

The hydraulic excavator includes the controller 80 described above and hydraulic/electric conversion devices 74a, 74b, 74c and 74d, electric/hydraulic conversion devices 75a and 75b, solenoid valves 95a, 95b, 96a and 96b and the work mode changeover switch 77 that relate to inputting to or outputting from the controller 80. The components mentioned of the hydraulic excavator configure a swing controlling system.

The controller 80 includes a hydraulic electric combined swing controlling block 83, an electric alone swing controlling block 84, a control changeover block 85 and so forth.

If a work other than a work for which accurate swing operability is demanded is selected by the work mode changeover switch 77, then in the controller 80, the control changeover block 85 selects the hydraulic electric combined swing controlling block 83, and swing actuator operation is controlled by the hydraulic electric combined swing controlling block 83. A hydraulic pilot signal generated by an input of the swing operation lever 72 is converted into electric signals by hydraulic/electric conversion devices 74c and 74d, and the electric signals are inputted to the hydraulic electric combined swing controlling block 83 and the electric alone swing controlling block 84. The working pressure of the swing hydraulic motor 27 is converted into electric signals by the hydraulic/electric conversion devices 74a and 74b, and the electric signals are inputted to the hydraulic electric combined swing controlling block 83. Also a swing motor speed signal outputted from an inverter for driving an electric motor in the power control unit 55 is inputted to the hydraulic electric combined swing controlling block 83.

The hydraulic electric combined swing controlling block 83 performs predetermined arithmetic operation on the basis of a hydraulic pilot signal from the swing operation lever 72 and an operation pressure signal and a swing motor speed signal from the swing hydraulic motor 27 to calculate a instruction torque for the swing electric motor 25, and outputs the swing electric motor torque instruction to the power control unit 55. Simultaneously, the hydraulic electric combined swing controlling block 83 outputs a pump absorption torque correction instruction for the hydraulic pump 41 to the electric/hydraulic conversion device 75a and outputs a reduction torque command for reducing the output torque of the swing hydraulic motor 27 to the electric/hydraulic conversion device 75b.

Meanwhile, a hydraulic pilot signal generated by an input of the swing operation lever 72 is inputted also to the control valve 42 through a swing pilot pressure cutting solenoid valve 96 hereinafter described to change over a spool 92 (refer to FIG. 4) from a neutral position to supply delivery fluid of the hydraulic pump 41 to the swing hydraulic motor 27. Consequently, also the swing hydraulic motor 27 is driven simultaneously.

Then, if a work for which accurate swing operability is required is selected in the work mode changeover switch 77, then in the controller 80, the control changeover block 85 selects the electric alone swing controlling block 84 and a swing actuator motion is controlled by the electric alone swing controlling block 84.

The electric alone swing controlling block 84 performs predetermined arithmetic operation on the basis of a hydraulic pilot signal from the swing operation lever 72 and a swing motor speed signal to calculate instruction torque for the swing electric motor 25 and outputs a switch electric motor torque instruction to the power control unit 55. Simultaneously, in order to eliminate an influence of the swing hydraulic motor 27 to be had on a swing motion, the electric alone swing controlling block 84 outputs a swing relief pressure reduction instruction for minimizing the relief pressure of overload relief valves 93a and 93b hereinafter described to the relief solenoid valves 95a and 95b. Further, in order to prevent a hydraulic pilot signal generated by the swing operation lever 72 from arriving at an operation portion of the spool 92 for the swing motor of the control valve 42 hereinafter described, the electric alone swing controlling block 84 outputs a blocking signal to the swing pilot pressure cutting solenoid valves 96a and 96b. As a result, electric alone swing control by which accurate swing operability is implemented is performed.

The control changeover block 85 has set therein in advance a relationship between an inputted work mode changeover signal and electric alone swing control or hydraulic-electric combined swing control. From this, if a work mode signal is inputted, then the swing control is automatically changed over between the electric alone swing control and the hydraulic-electric combined swing control.

Figure 4:
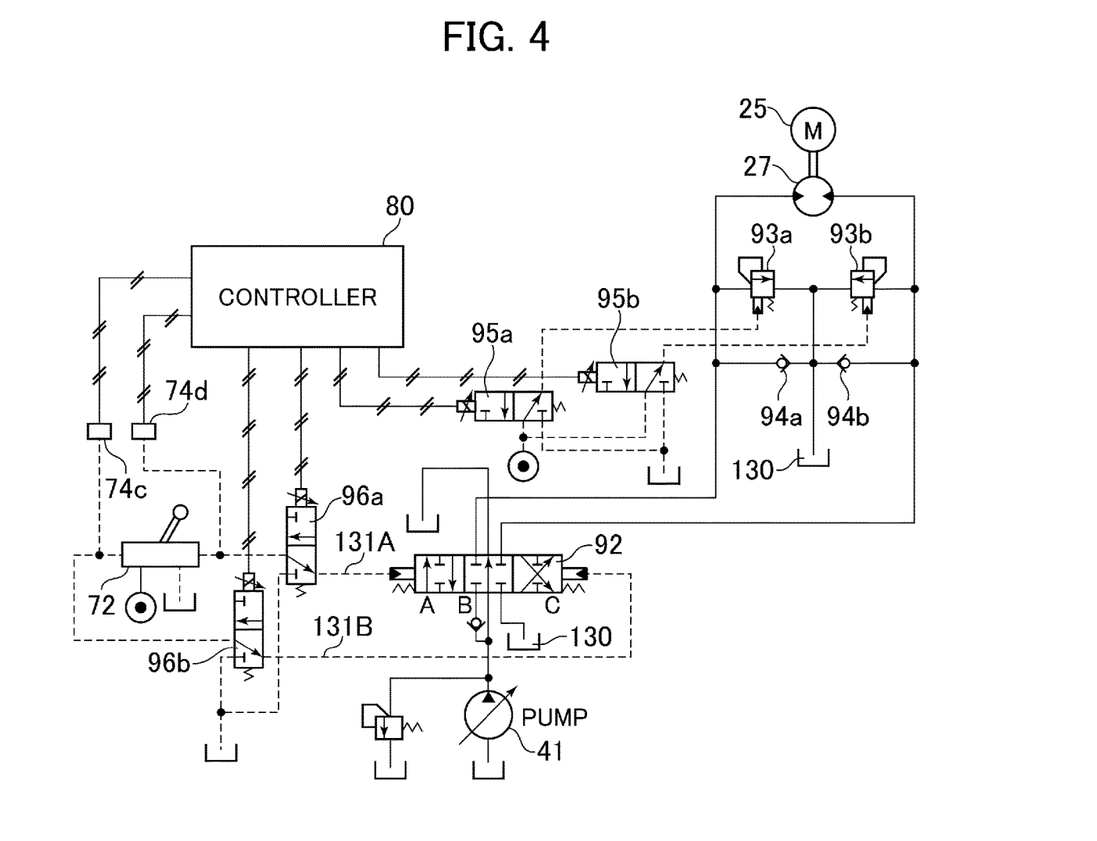
FIG. 4 is a system configuration diagram depicting a hydraulic system of the first embodiment of the hybrid-type construction machine of the present invention.

Now, the swing hydraulic system in the first embodiment of the hybrid-type construction machine of the present invention is described with reference to FIG. 4. FIG. 4 is a system configuration diagram depicting a hydraulic system of the first embodiment of the hybrid-type construction machine of the present invention. In FIG. 4, like reference characters to those in FIGS. 1 to 3 denote like elements, and therefore, detailed description of them is omitted herein.

The control valve 42 of FIG. 3 includes a valve part called spool for each actuator, and in response to an instruction (hydraulic pilot signal) from the swing operation lever 72 or some other operation device not depicted in the drawings, a corresponding spool is displaced, by which the opening area varies and the flow rate of hydraulic fluid that passes a respective hydraulic line varies. The swing hydraulic system depicted in FIG. 4 includes only a spool for swing.

Referring to FIG. 4, the swing hydraulic system includes the hydraulic pump 41 and swing hydraulic motor 27 described hereinabove, the swing operation lever 72, the spool 92, the variable overload relief valves 93a and 93b for swing, check valves 94a and 94b for swing, the relief solenoid valves 95a and 95b for allowing the relief pressure of the variable overload relief valves to change, the swing pilot pressure cutting solenoid valves 96a and 96b for reducing the pilot pressure to an operation portion of the spool 92 as occasion demands, and a tank 130.

The hydraulic pump 41 is a variable capacity pump and includes a regulator not depicted. By rendering the regulator operative, the tilting angle of the hydraulic pump 41 changes and the capacity of the hydraulic pump 41 changes, and the discharge flow rate and the output torque of the hydraulic pump 41 change. If a pump absorption torque correction instruction is outputted from the hydraulic electric combined swing controlling block 83 to the electric/hydraulic conversion device 75a of FIG. 3, then the electric/hydraulic conversion device 75a outputs corresponding controlling pressure to the regulator to change the setting of the regulator so as to reduce the maximum output torque of the hydraulic pump 41.

The spool 92 has three positions A, B and C and receives a swing operation instruction (hydraulic pilot signal) from the swing operation lever 72 to continuously change over the position thereof from the neutral position B to the A position or the C position.

The swing operation lever 72 has built therein a pressure reducing valve for reducing the pressure from a pilot pressure source connected thereto in response to a lever operation amount. The pressure (hydraulic pilot signal) in accordance with the lever operation amount is provided to one of left and right operation portions of the spool 92 through a line 131A or 131B and the swing pilot pressure cutting solenoid valve 96a or 96b.

Pressure sensors 74c and 74d for detecting in-line pressure are provided for the lines 131A and 131B, respectively. Further, the swing pilot pressure cutting solenoid valves 96a and 96b for controlling communication/cut-off of pilot oil in the lines 131A and 131B are provided in the lines 131A and 131B, respectively.

The swing pilot pressure cutting solenoid valves 96a and 96b are solenoid-operated 3-port 2-position type control valves and selectively control communication/cut-off between the operation portions of the spool 92 and the pressure reducing valve of the swing operation lever 72. When the swing pilot pressure cutting solenoid valves 96a and 96b are not excited, they are positioned by respective spring members to place the operation portions of the spool 92 and the pressure reducing valve of the swing operation lever 72 into a communication state. The swing pilot pressure cutting solenoid valves 96a and 96b have a solenoid driving unit disposed on one side thereof, and an output cable from a controller is connected to the solenoid driving unit.

When the spool 92 is positioned at the neutral position B, hydraulic fluid delivered from the hydraulic pump 41 returns to the tank 130 through a bleed-off throttle. If the spool 92 is acted upon by pressure (hydraulic pilot signal) in accordance with a lever operation amount and changed over to the A position, then the hydraulic fluid from the hydraulic pump 41 is fed to the left side of the swing hydraulic motor 27 passing a meter-in throttle at the A position, and returning hydraulic fluid from the swing hydraulic motor 27 returns to the tank 130 passing a meter-out throttle at the A position, and the swing hydraulic motor 27 rotates in one direction. On the contrary, if the spool 92 is acted upon by pressure (hydraulic pilot signal) in accordance with a lever operation amount and changed over to the C position, then the hydraulic pressure from the hydraulic pump 41 is fed to the right side of the swing hydraulic motor 27 passing a meter-in throttle at the C position, and returning hydraulic pressure from the swing hydraulic motor 27 returns to the tank 130 passing a meter-out throttle at the C position. The swing hydraulic motor 27 rotates in the opposite direction to that in the case where the spool 92 is at the A position.

When the spool 92 is positioned intermediately between the B position and the A position, the hydraulic fluid from the hydraulic pump 41 is distributed to the bleed-off throttle and the meter-in throttle. At this time, pressure in accordance with an opening area of the bleed-off throttle is established on the input side of the meter-in throttle, and the hydraulic fluid is supplied to the swing hydraulic motor 27 by the pressure and provides working torque in accordance with the pressure (opening area of the bleed-off throttle) to the swing hydraulic motor 27. Further, discharged hydraulic fluid from the swing hydraulic motor 27 is acted upon by resistance in accordance with the opening area of the meter-out throttle at the time to give rise to back pressure, and braking torque in accordance with the opening area of the meter-out throttle is generated. This similarly applies also where the spool 92 is positioned intermediately between the B position and the C position.

When the swing operation lever 72 is returned to the neutral position and the spool 92 is returned to the neutral position B, since the swing body 20 is an inertial body, the swing hydraulic motor 27 tends to continue its rotation by its inertia. At this time, when the pressure (back pressure) of the discharged hydraulic fluid from the swing hydraulic motor 27 tends to exceed the set pressure of the variable overload relief valve 93a or 93b for swing, the variable overload relief valve 93a or 93b for swing is rendered operative to escape part of the hydraulic fluid to the tank 130 thereby to restrict a rise of the back pressure. Consequently, braking torque in accordance with the set pressure of the variable overload relief valve 93a or 93b for swing is generated.

It is to be noted that the check valves 94a and 94b for preventing discharged hydraulic fluid from the swing hydraulic motor 27 from flowing back to a different system when the variable overload relief valve 93a or 93b for swing operates are provided together with the variable overload relief valves 93a and 93b for swing such that they are open only to the swing hydraulic motor 27 side from the tank 130 side.

The variable overload relief valves 93a and 93b for swing have a pilot pressure receiving portion. The pilot pressure receiving portions are supplied with pilot hydraulic fluid from the pilot hydraulic fluid pressure through the relief solenoid valves 95a and 95b. The set pressure of the variable overload relief valves 93a and 93b for swing can be varied by the pressure of pilot hydraulic fluid supplied to the pressure receiving portions.

The relief solenoid valves 95a and 95b are solenoid-operated 3-port 2-position type control valves and selectively control communication/cut-off between the pilot hydraulic fluid source and the pressure receiving portions of the variable overload relief valves 93a and 93b for swing. When the relief solenoid valves 95a and 95b are not excited, they are positioned by springs so as to place the pilot hydraulic fluid source and the pressure receiving portions of variable overload relief valves for swing in a communication state. The relief solenoid valves 95a and 95b have a solenoid driving unit disposed on one side thereof, and an output cable from a controller is connected to the solenoid driving unit.

Now, operation of the embodiment of the present invention is described with reference to FIGS. 3 and 4.

If a work other than works for which accurate swing operability is demanded is selected by the work mode changeover switch 77, then in the controller 80, the control changeover block 85 selects the hydraulic electric combined swing controlling block 83. A swing relief pressure reducing instruction and a swing pilot pressure cutting instruction are not outputted from the electric alone swing controlling block 84 depicted in FIG. 3. As a result, the variable overload relief valves 93a and 93b and the swing pilot pressure cutting solenoid valves 96a and 96b are placed in a non-excited state in FIG. 4.

Since the solenoid valves are not excited, pilot hydraulic fluid is supplied from the pilot hydraulic fluid source to the pressure receiving portions of the variable overload relief valves 93a and 93b for swing, and the set pressure of the relief values becomes equal to a value set in advance. Further, the operation portions of the spool 92 and the pressure reducing valve of the swing operation lever 72 are placed in a communication state, and it becomes possible for pilot hydraulic oil in accordance with an operation amount of the swing operation lever 72 to be supplied to the operation portion of the spool 92.

If the swing operation lever 72 is operated, then the hydraulic fluid is supplied to one of the left and right operation portions of the swing operation lever 72 through the line 131A or 131B to drive the spool to place a main hydraulic circuit between the hydraulic pump 41 and the swing hydraulic motor 27 into a communicated state. As a result, the swing hydraulic motor 27 rotates to drive the swing body 20.

Then, if a work for which accurate swing operability is demanded is selected by the work mode changeover switch 77, then in the controller 80, the control changeover block 85 selects the electric alone swing controlling block 84. The swing actuator motion is controlled by the electric alone swing controlling block 84. At this time, a swing relief valve reducing instruction and a swing pilot pressure cutting instruction are outputted from the electric alone swing controlling block 84 depicted in FIG. 3. As a result, in FIG. 4, the variable overload relief valves 93a and 93b and the swing pilot pressure cutting solenoid valves 96a and 96b are excited.

Since the solenoid valves are excited, pilot hydraulic fluid supplied to the pressure receiving portions of the variable overload relief valves 93a and 93b for swing is discharged into the tank 130. As a result, the set pressure of the relief values becomes a minimum value. As a result, the brake pressure to the swing hydraulic motor 27 decreases, and the influence of the swing hydraulic motor 27 on the swing motion can be reduced. Further, the operation portions of the spool 92 and the pressure reducing valve of the swing operation lever 72 are placed into a cut-off state, and supply of pilot hydraulic fluid in accordance with an operation amount of the swing operation lever 72 to the operation portions of the spool 92 is stopped. As a result, the influence of the swing hydraulic motor 27 on the swing motion can be reduced. As a result, electric alone swing control by which accurate swing operability is implemented is performed.

In this manner, in the present embodiment, only if a work mode is selected, then the swing driving method can be changed over from the hydraulic-electric combined method to the electric alone driving method. If the operator selects a work mode, then the operator can work with swing operability optimum to the work without being aware of the swing driving method. However, it is necessary to determine in advance at a design stage of a controller in which work mode the changeover to electric alone swinging is to be performed. An example of such a special work mode as just described is described below.

In the case of a work for assembling constructional materials using a construction machine, for example, a mode called "handling mode" is provided. An attachment that can grasp a target construction material such as a grapple is mounted on a construction machine, and assembly is performed while the construction material is held at an appropriate position. When such a work as just described is to be performed, high positioning accuracy such as to align bolt holes is demanded, and the electric alone swing method that is superior in control accuracy is preferably used. In such a work as just described, if the operator selects the "handling mode," then since the swing method changes over to the electric alone swing method, an accurate operation can be implemented only by changing the work mode.

When a finishing work of a ground leveling work is performed using a construction machine, for example, a work mode called "fine mode" is provided. The ground leveling finishing work includes a movement of drawing the bucket toe horizontally to level the ground. At this time, a horizontal oblique drawing movement of drawing the bucket toe obliquely while a swing movement is performed frequently. Where such a work as just described is performed, if the swing movement is changed over to the electric alone swing method, then since the swing speed does not rely upon other actuators, the operation feeling in a fine operation region is significantly improved. This work mode is also applicable to another finishing work such as slope finishing. In such a work as just described, if the operator selects the "fine mode," then since the swing method changes over to the electric alone swing method, a feeling in a fine swing operation can be improved only by changing the work mode.

With the first embodiment of the hybrid-type construction machine of the present invention described hereinabove, when a work mode for which accurate swing operability is demanded is selected, electric alone swing of driving the swing body 20 by the swing electric motor alone is performed. As a result, since high swing operability can be implemented, the general versatility of the hybrid-type construction machine is improved.

Second Embodiment

Figure 5:
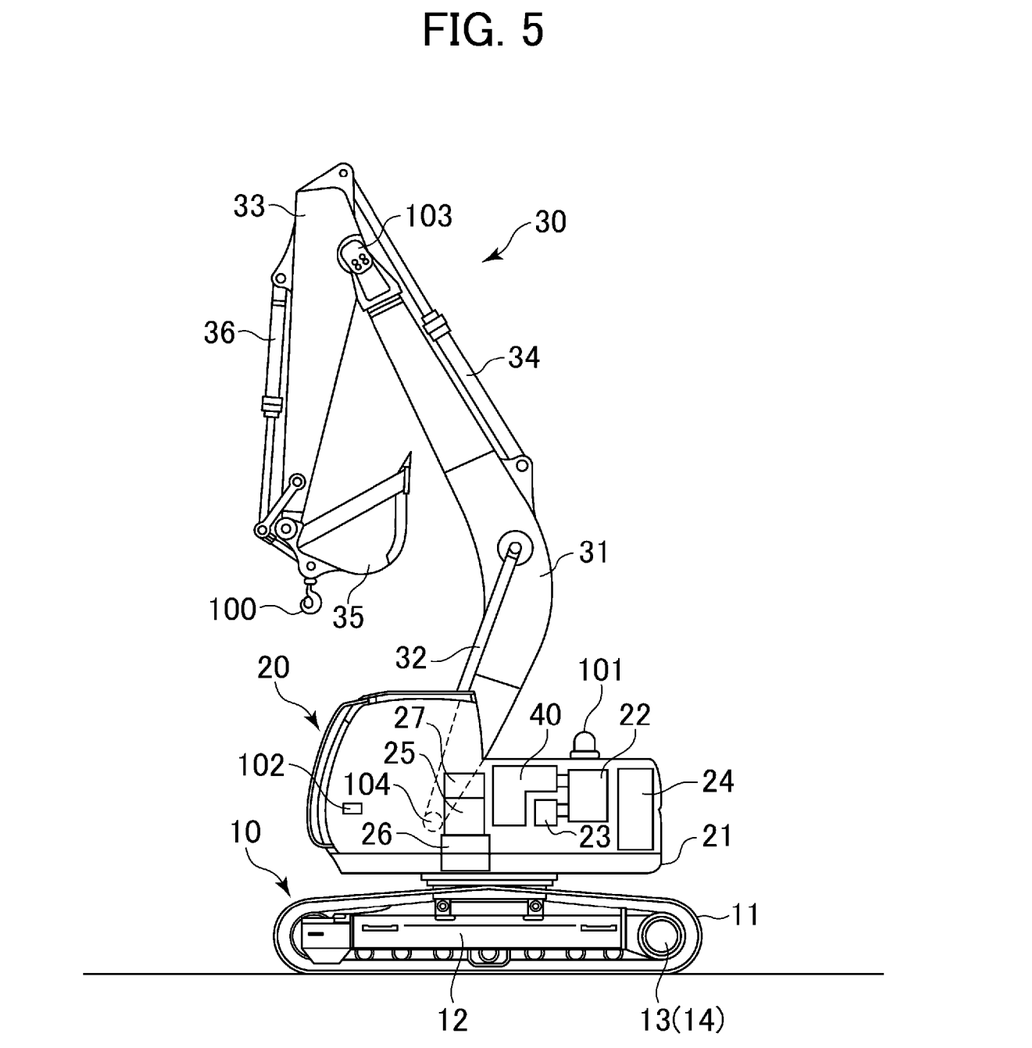
FIG. 5 is a side elevational view depicting a second embodiment of the hybrid-type construction machine of the present invention.
Figure 6:
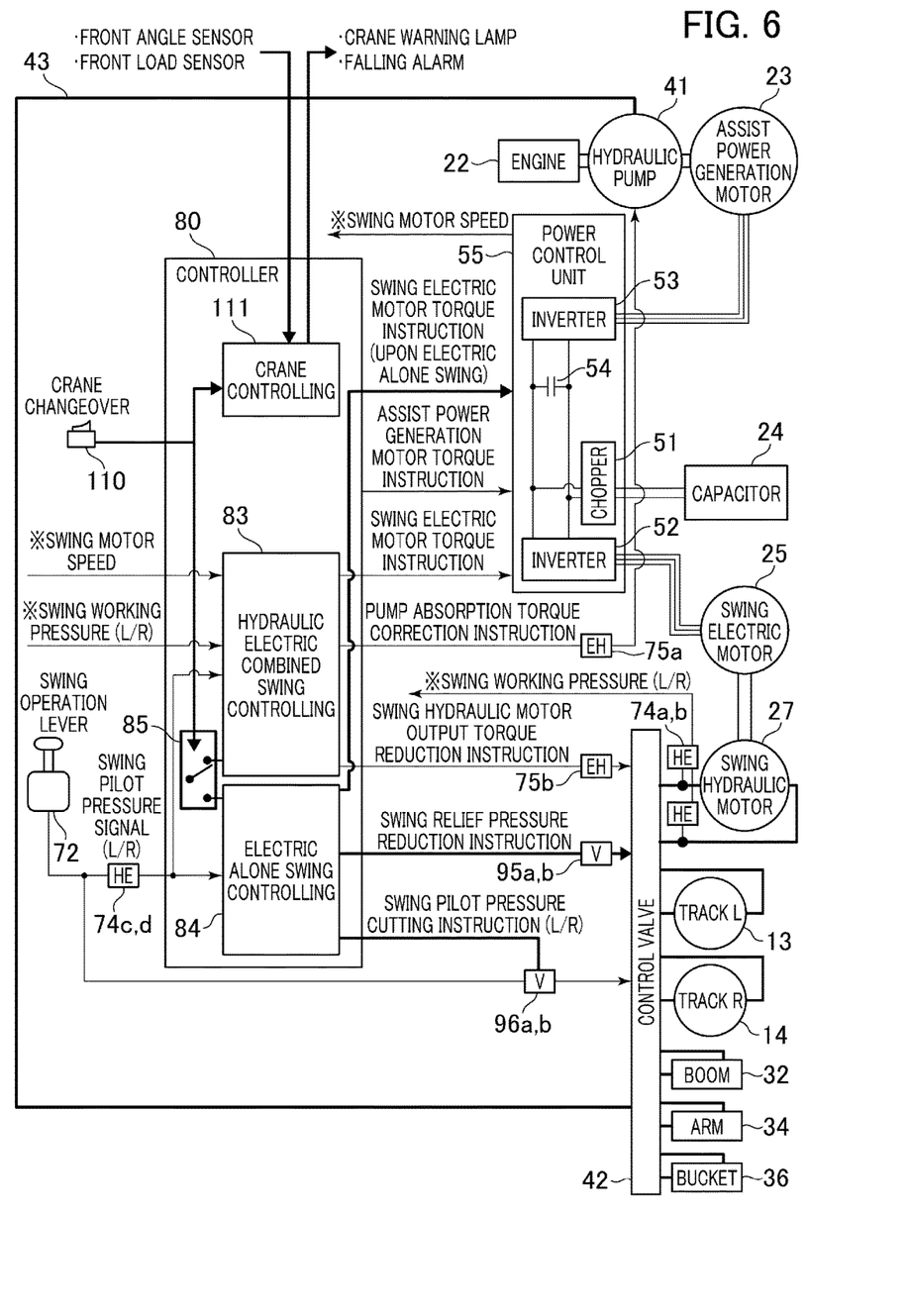
FIG. 6 is a system configuration and control block diagram of the second embodiment of the hybrid-type construction machine of the present invention.

In the following, a second embodiment of the hybrid-type construction machine of the present invention is described with reference to the drawings. FIG. 5 is a side elevational view of the second embodiment of the hybrid-type construction machine of the present invention, and FIG. 6 is a system configuration and control block diagram of the second embodiment of the hybrid-type construction machine of the present invention. In FIGS. 5 and 6, like reference characters to those depicted in FIGS. 1 to 4 denote like elements, and therefore, detailed description of them is omitted herein.

The second embodiment of the hybrid-type construction machine of the present invention described below is a hybrid-type construction machine that includes a crane mode.

The hybrid-type construction machine including the crane mode depicted in FIG. 5 includes, in addition to the components of the hydraulic excavator of the first embodiment, a hook 100 for suspending a load, a crane mode external indication lamp 101 provided on an upper face of a rear portion of an outer cover of the swing body 20, a level 102 provided in the cab, an arm angle sensor 103 provided at a distal end portion of the boom 31, and a boom angle sensor 104 provided at a proximal end portion of the arm. Further, the hydraulic system includes a boom cylinder bottom pressure sensor not depicted. Further, the hook 100 is provided between the distal end of the arm 33 and the proximal end of the bucket 35.

If the mode of the hybrid-type construction machine is set to the crane mode, then the crane mode external indication lamp 101 is turned on to provide a warning to the surroundings. Further, the weight of the suspended load is estimated by the boom cylinder bottom pressure sensor and the posture of the machine body is measured by the level 102, boom angle sensor 104 and arm angle sensor 103 to detect the danger of the machine body falling. Suspension of the load is performed using the hook 100. Since there is a possibility that the bucket may hit the suspended load or a suspender if the bucket moves, the bucket position is fixed by a bucket lock solenoid valve not depicted.

A configuration of the control system in the present embodiment is depicted in FIG. 6. In FIG. 6, a crane changeover switch 110 is provided in place of the work mode changeover switch 77 in the first embodiment, and the controller 80 includes a crane mode controlling unit 111.

Now, operation of the embodiment of the present invention is described.

If a crane work is not selected by the crane changeover switch 110, then in the controller 80, the control changeover block 85 selects the hydraulic electric combined swing controlling block 83. From the electric alone swing controlling block 84 depicted in FIG. 3, a swing relief pressure reducing instruction and a swing pilot pressure cutting instruction are not outputted. As a result, in FIG. 4, the variable overload relief valves 93a and 93b and the swing pilot pressure cutting solenoid valves 96a and 96b are controlled to an unexcited state, and operation similar to that in the case where a work other than the works for which accurate swing operability is demanded is selected by the work mode changeover switch 77 in the first embodiment is performed.

If a crane work is selected by the crane changeover switch 110, then the crane mode controlling unit 111 in the controller 80 first changes over the mode of the hybrid-type construction machine to the crane mode. In particular, the crane mode controlling unit 111 outputs a turn-on instruction to the crane mode external indication lamp 101 and performs other control necessary for the crane work such as falling prevention warning.

Meanwhile, in the controller 80, the control changeover block 85 selects the electric alone swing controlling block 84. The swing actuator motion is controlled by the electric alone swing controlling block 84. At this time, a swing relief pressure reduction instruction and a swing pilot pressure cutting instruction are outputted from the electric alone swing controlling block 84 depicted in FIG. 3. As a result, in FIG. 4, the variable overload relief valves 93a and 93b and the swing pilot pressure cutting solenoid valves 96a and 96b are excited, and operation similar to that in the case where a work other than the works for which accurate swing operability is demanded is selected by the work mode changeover switch 77 in the first embodiment is performed.

With the second embodiment of the hybrid-type construction machine of the present invention described above, effects similar to those achieved by the first embodiment described hereinabove can be achieved.

Further, with the second embodiment of the hybrid-type construction machine of the present invention described hereinabove, in the hybrid-type construction machine that includes the crane mode, electric alone swing wherein the swing body 20 is automatically driven by the swing electric motor alone is performed in the crane mode. Since accurate swing motion is demanded for the crane work, the electric alone swing control that is superior in controllability of the swing position and the swing speed is suitable. If the operator sets the work mode to the crane work, then control necessary to perform the crane work is executed, and the driving method is automatically changed over to the swing driving method optimum for the crane mode. As a result, since high swing workability is implemented, the productivity is improved.

Third Embodiment

Figure 7:
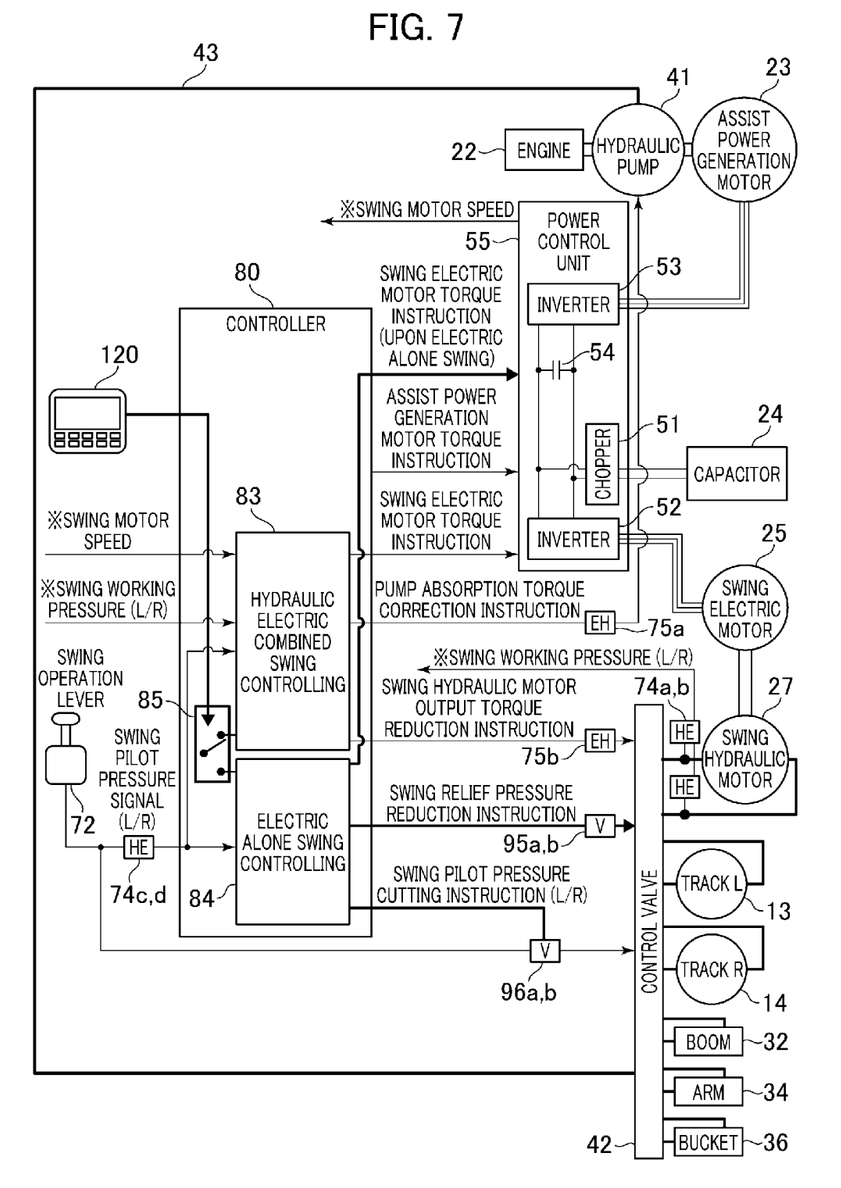
FIG. 7 is a system configuration and control block diagram of a third embodiment of the hybrid-type construction machine of the present invention.
Figure 8:
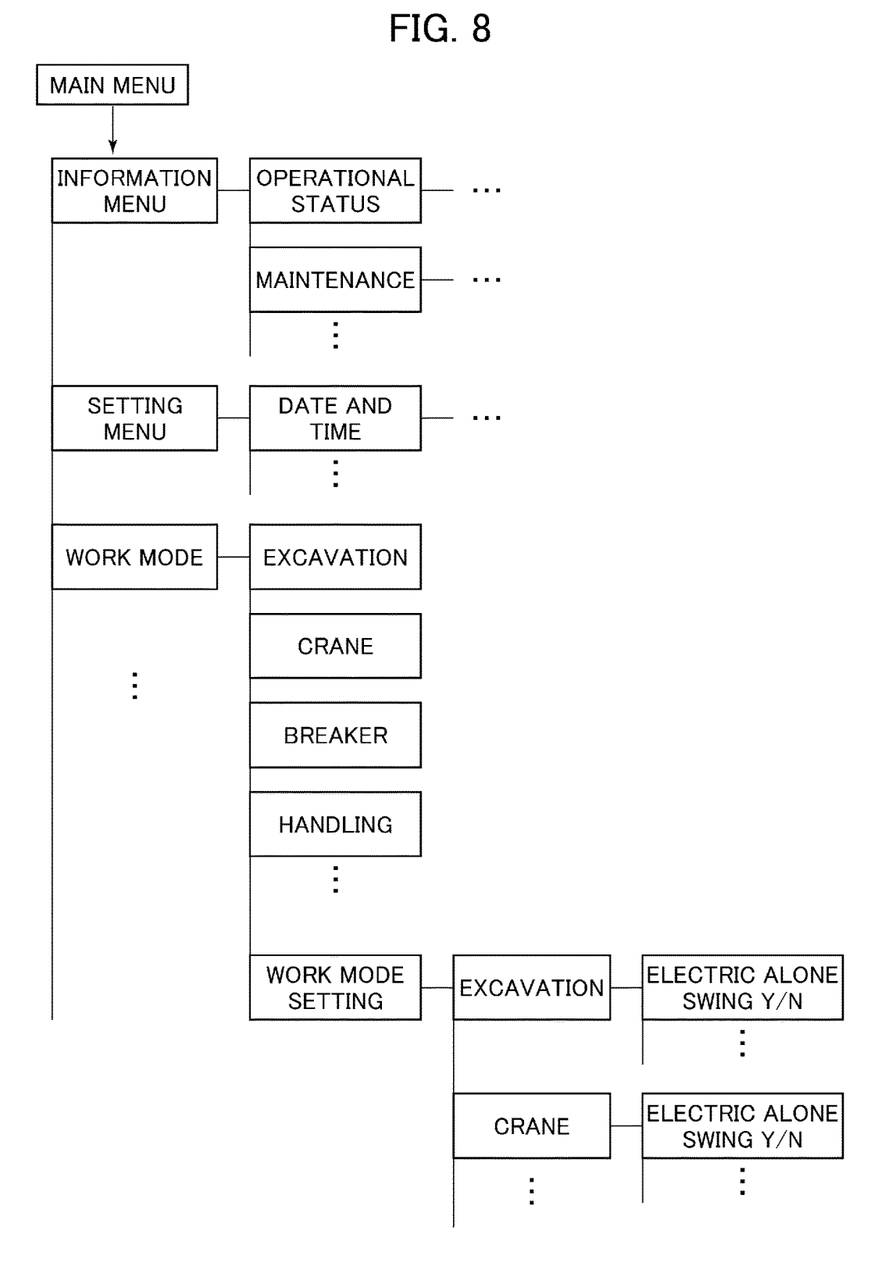
FIG. 8 is a conceptual diagram depicting an example of work mode setting of a display device that configures the third embodiment of the hybrid-type construction machine of the present invention.

In the following, a third embodiment of the hybrid-type construction machine of the present invention is described with reference to the drawings. FIG. 7 is a system configuration and control block diagram of the third embodiment of the hybrid-type construction machine of the present invention, and FIG. 8 is a conceptual diagram depicting an example of work mode setting of a display device that configures the third embodiment of the hybrid-type construction machine of the present invention. In FIGS. 7 and 8, like reference characters to those in FIGS. 1 to 6 denote like elements, and therefore, detailed description of them is omitted herein.

Although the third embodiment of the hybrid-type construction machine of the embodiment depicted in FIG. 7 is configured from apparatus similar to those of the first embodiment, it is different in the following configuration.

While, in the first embodiment, the work mode changeover switch 77 is provided in the cab, the present embodiment is different in that a display device 120 to and from which information can be inputted and outputted is provided in place of the work mode changeover switch 77. If the operator selects a work mode on the display device 120, then a swing driving method suitable for the selected work mode can be implemented automatically.

Further, in the present embodiment, it is possible to set on the display device 120 in the cab whether or not the swing method is to be changed over to the electric alone mode in each work mode. FIG. 8 depicts a menu configuration of the display device 120.

In a main menu of FIG. 8, a work mode such as, for example, an "excavation" work can be selected in the item of "work mode." Further, at this time, if "work mode setting" is selected automatically, then in each work mode, the setting regarding whether or not there is electric alone swing set in advance can be changed. For example, if the "work mode setting"→"excavation"→"electric alone swing: N" is selected, then if the work mode for excavation is selected, then electric alone swing is not executed.

Here, if setting change of the display device 120 is performed, then various constants of the control changeover block 85 of the controller 80 are rewritten, and consequently, changeover of the electric alone swing and the hydraulic-electric combined swing is performed. The setting regarding whether or not the electric alone swing is to be performed in the target work mode can be changed by the operator itself or a service personnel of a maker or the like.

In the first and second embodiments described above, for example, if driving of the swing electric motor 25 is disabled by some circumstances such as failure of the electric driving system, there is the possibility that the swing operation may not be able to be performed. Further, since the swing driving method is automatically changed over if the work mode is changed over, even when the operator does not desire the operability of the electric alone swing, depending upon the work mode, there is the possibility that it may not be able to perform the electric alone swing. With the present third embodiment, even in such a case as just described, since the setting regarding whether or not the electric alone swing is to be performed can be changed, the problems mentioned can be solved.

With the third embodiment of the hybrid-type construction machine of the present invention described above, effects similar to those achieved by the first embodiment described hereinabove can be achieved.

Further, with the third embodiment of the hybrid-type construction machine of the present invention described above, since the setting regarding whether or not the electric alone swing is to be performed can be changed, even in the case where the electric alone swing is ready for a work mode set in advance and driving of the swing electric motor 25 is disabled or the operator does not prefer the operability of the electric alone swing, the setting of the electric alone swing can be changed to perform a work. This improves the workability.

Fourth Embodiment

Figure 9:
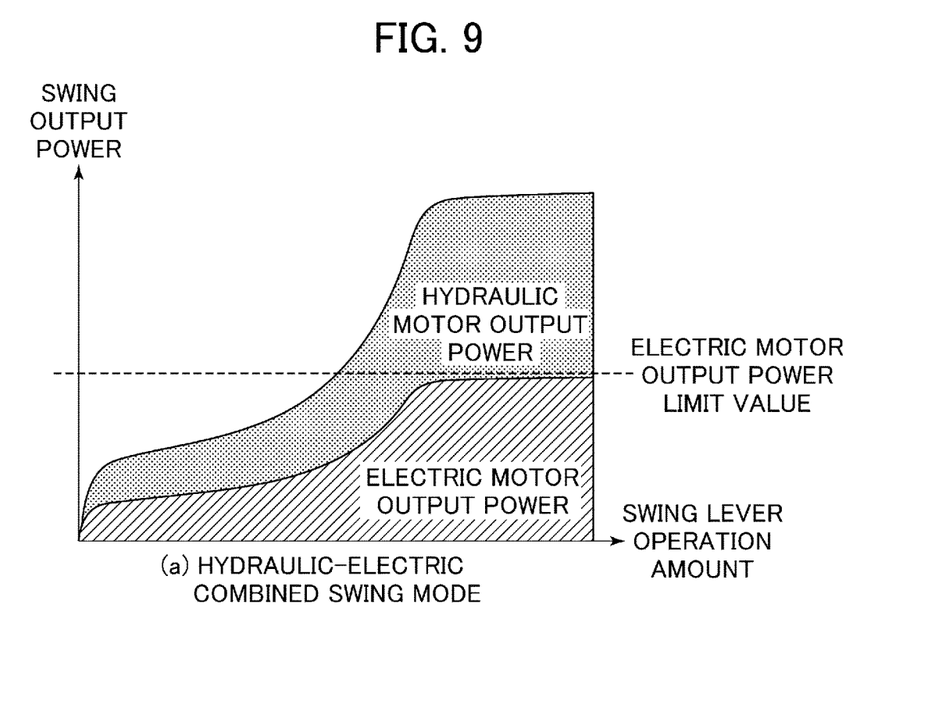
FIG. 9 is a characteristic diagram illustrating output characteristics of an electric motor and a hydraulic motor in a hydraulic-electric combined swing mode in a fourth embodiment of the hybrid-type construction machine of the present invention.

In the following, a fourth embodiment of the hybrid-type construction machine of the present invention is described with reference to the drawings. FIG. 9 is a characteristic diagram illustrating output characteristics of an electric motor and a hydraulic motor in a hydraulic-electric combined swing mode in a fourth embodiment of the hybrid-type construction machine of the present invention, and FIG. 10 is a characteristic diagram illustrating output characteristics of the electric motor and the hydraulic motor in an electric alone swing mode in the fourth embodiment of the hybrid-type construction machine of the present invention.

Although the fourth embodiment of the hybrid-type construction machine of the present invention is configured from apparatus generally similar to those of the first embodiments, it is different in that it is characterized in the output characteristic of the swing electric motor in the electric alone swing.

In the present embodiment, in a work mode in which changeover to the electric alone swing is performed, the swing output power is kept within a fixed value to make it possible to adopt a swing electric motor of low output power. FIG. 9 depicts a characteristic of the swing output power in the hydraulic-electric combined swing, and the axis of ordinate indicates the swing output power and the axis of abscissa indicates the operation amount of the swing operation lever 72. As depicted in FIG. 9, the swing output power is the total of the output power of the swing hydraulic motor 27 and the output power of the swing electric motor 25. It is to be noted that this output power characteristic is set in advance in the hydraulic electric combined swing controlling block 83 of the controller 80.

Figure 10:
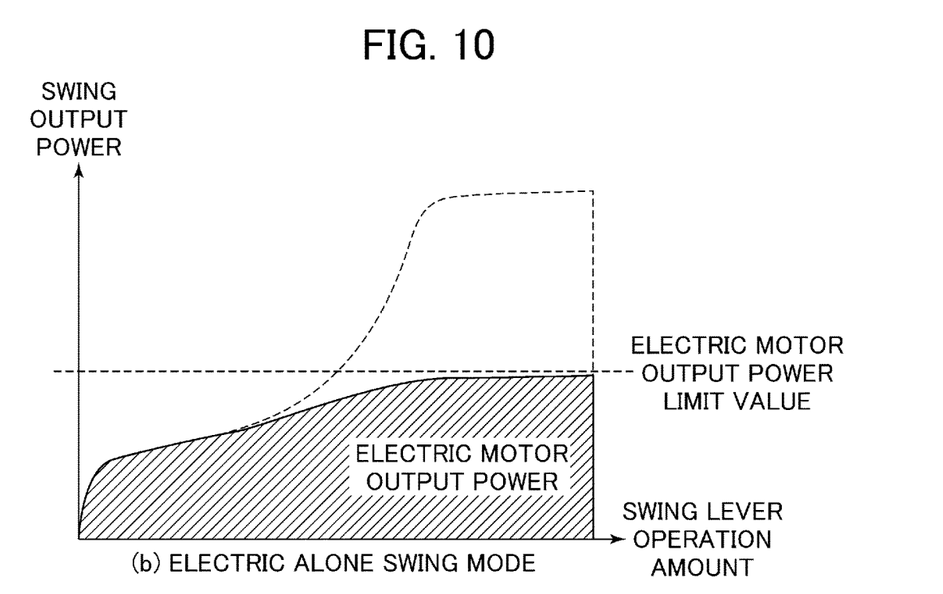
FIG. 10 is a characteristic diagram illustrating output characteristics of the electric motor and the hydraulic motor in an electric alone swing mode in the fourth embodiment of the hybrid-type construction machine of the present invention.

FIG. 10 depicts a characteristic of the swing output power in the electric alone swing mode, which is set in advance in the electric alone swing controlling block 84 of the controller 80. As depicted in FIGS. 9 and 10, in the electric alone swing, when an operation amount of the swing operation lever 72 is small, swing output power equal to that of the hydraulic-electric combined swing is borne only by the swing electric motor 25. Further, the output power of the swing electric motor 25 is restricted such that, in the proximity of a maximum operation amount of the swing operation lever 72, it remains within the range of limit output power of the swing electric motor 25.

In the present embodiment, as a work for changing over to the electric alone swing, a work is assumed in which the swing controllability is more significant than the swing speed or the swing power. In such a work as just described, even in the proximity of a maximum operation amount of the swing operation lever 72, high swing power is not demanded. Especially in the crane work mode, since it is dangerous if sudden swing acceleration occurs, it is desirable to limit the swing output power in the proximity of the maximum operation amount of the swing operation lever 72.

With the fourth embodiment of the hybrid-type construction machine of the present invention described above, effects similar to those achieved by the first embodiment described hereinabove can be achieved.

Further, with the fourth embodiment of the hybrid-type construction machine of the present invention described above, in the electric alone swing, when the operation amount is small, operability similar to that in the hydraulic-electric combined swing is implemented, and in the proximity of the maximum operation amount of the swing operation lever 72, the swing speed can be limited. Consequently, the swing motor output power may be low. Thus, even if the electric alone swing method is adopted, there is no necessity to use a high output power motor for the swing electric motor 25. As a result, the necessity for increase of the capacity of a harness, control apparatus, battery and so forth arising from increase of the output power of the electric motor is eliminated, and a significant increase of the cost can be prevented.

DESCRIPTION OF REFERENCE CHARACTERS

10: Track structure
11: Crawlers
12: Crawler frames
13: Track hydraulic motor
14: Track hydraulic motor
20: Swing body
21: Swing frame
22: Engine
23: Assist power generation motor
24: Capacitor
25: Swing electric motor
26: Speed reduction mechanism
27: Swing hydraulic motor
30: Front work apparatus
31: Boom
32: Boom cylinder
33: Arm
34: Arm cylinder
35: Bucket
36: Bucket cylinder
40: Hydraulic system
41: Hydraulic pump
42: Control valve
51: Chopper
52: Inverter for driving the swing electric motor
53: Inverter for driving the assist power generation motor
54: Smoothing capacitor
55: Power control unit
72: Swing operation lever (Pilot valve)
74$a$, 74$b$: Hydraulic/electric signal conversion device
74$c$, 74$d$: Hydraulic/electric signal conversion device (Pressure sensor)
75: Electric/hydraulic conversion device
77: Work mode changeover switch (Work mode changeover unit)
80: Controller (Control apparatus)
83: Hydraulic electric combined swing controlling block

84: Electric alone swing controlling block (Electric alone swing controlling unit)
85: Control changeover block
92: Spool for a swing motor
93a, 93b: Variable overload relief valves for swing
94a, 94b: Check valves
95a, 95b: Relief solenoid valves
96a, 96b: Swing pilot pressure cutting solenoid valves
100: Hook
101: Crane mode external indication lamp
102: Level
103: Arm angle sensor
104: Boom angle sensor
110: Crane changeover switch
111: Crane mode controlling unit

The invention claimed is:

1. A hybrid-type construction machine that includes an engine, a hydraulic pump driven by the engine, a swing body, an electric motor for driving the swing body, and a hydraulic motor driven by the hydraulic pump for driving the swing body, the swing body being swung by simultaneous drive by the electric motor and the hydraulic motor, wherein the hybrid-type construction machine comprises a control apparatus including
a work mode changeover unit by which an operator changes over a mode in response to an aspect of a work, and
an electric alone swing controlling unit configured to control the swing body to be swung by the electric motor alone, the electric alone swing controlling unit being configured to swing the swing body when a work in which position accuracy is demanded is selected by the work mode changeover unit.

2. The hybrid-type construction machine according to claim 1, wherein,
when a crane mode is selected by the work mode changeover unit, the control apparatus controls the electric alone swing controlling unit to swing the swing body.

3. The hybrid-type construction machine according to claim 1, wherein
the control apparatus can set for each work mode whether or not the electric alone swing controlling unit is to be used.

4. The hybrid-type construction machine according to claim 1, wherein
maximum output power of the electric motor is lower than maximum output power of the hydraulic motor, and
when a work for which a high swing speed is not demanded but positioning accuracy is demanded is selected by the work mode changeover unit, the control apparatus controls the electric alone swing controlling unit to swing the swing body.

5. The hybrid-type construction machine according to any one of claims 1 to 4, further comprising:
a swing operation lever apparatus configured to issue an instruction for driving the swing body; and
an operation amount detection unit configured to detect an operation amount of the swing operation lever apparatus, wherein
the electric alone swing controlling unit of the control apparatus is configured to:
fetch an operation amount of the swing operation lever apparatus detected by the operation amount detection unit; and
control output power of the electric motor by
setting, in a region in which the swing operation amount is small, output power equal to that in combined driving of the electric motor and the hydraulic motor as a target value, and
setting, when the operation amount is a maximum value, output power that does not exceed a limit output power of the electric motor as a target value.

* * * * *